United States Patent [19]

Higashimoto

[11] Patent Number: 4,691,411
[45] Date of Patent: Sep. 8, 1987

[54] METHOD AND APPARATUS FOR FEEDING MEAT

[75] Inventor: Tsuyoshi Higashimoto, Ikoma, Japan

[73] Assignee: Higashimoto Kikai Co., Ltd., Japan

[21] Appl. No.: 809,136

[22] Filed: Dec. 16, 1985

[51] Int. Cl.$^4$ ............................................. A22C 11/08
[52] U.S. Cl. .......................................... 17/49; 17/39
[58] Field of Search ...................................... 17/38, 39

[56] References Cited

U.S. PATENT DOCUMENTS

| 3,456,285 | 7/1969 | Miller et al. ............................ 17/39 |
| 3,473,189 | 10/1969 | Middleton ............................ 17/39 X |
| 4,097,962 | 7/1978 | Alley et al. ............................ 17/39 |
| 4,191,309 | 3/1980 | Alley et al. ............................ 17/39 X |

FOREIGN PATENT DOCUMENTS

| 189531 | 4/1957 | Austria ................................. 17/39 |
| 1289760 | 2/1969 | Fed. Rep. of Germany .......... 17/38 |
| 2843624 | 8/1979 | Fed. Rep. of Germany .......... 17/38 |

OTHER PUBLICATIONS

Pamphlet, "Handtmann Filling and Portioning Machines", published by Albert Handtmann GmbH & Co.
Pamphlet, "Nantsune Air Stuffer", published by Nantsune Tekko Co., Ltd.

Primary Examiner—Willie G. Abercrombie
Attorney, Agent, or Firm—Kirschstein, Kirschstein, Ottinger & Israel

[57] ABSTRACT

There is provided a method and apparatus for feeding meat, in which at least two reciprocating pumps (4L and 4R or A, B and C) are used in order to suck meat alternately into the feed cylinders (6L and 6R) of the reciprocating pumps and deliver it alternately from the feed cylinders of the reciprocating pumps. Prior to the completion of the delivery stroke of one reciprocating pump, the delivery stroke of another reciprocating pump is started so that meat is continuously fed with the pressure thereon maintained at a constant level.

12 Claims, 8 Drawing Figures

METHOD AND APPARATUS FOR FEEDING MEAT

BACKGROUND OF THE INVENTION

1. Field of the Invention

This invention relates to a method and apparatus for feeding meat such as a material for coarsely ground sausages. Particularly, the invention relates to a method and apparatus for feeding meat by means of reciprocating pumps each having a feed cylinder suitable for sucking and delivering meat.

2. Prior Art

Heretofore, a reciprocating pump having a feed cylinder and a piston has been commonly used for feeding meat which is a material for coarsely ground sausages to be fed to sausage stuffing machines. The feed cylinder is suitable for sucking and delivering meat. The piston is received in the cylinder for reciprocating movement and functions to suck meat into the feed cylinder and deliver it from the feed cylinder. The meat is fed from the feed cylinder to the sausage stuffing machines, which fills the meat into sausage casings.

In this type of sausage stuffing machines, to ensure reliable filling of meat into casings, the pressure on the meat in the stuffing machine must be maintained constant at all times. However, it has heretofore been difficult to maintain the pressure on the meat at a constant level all the time because of the characteristics of the reciprocating pump. During the delivery stroke of the reciprocating pump, meat can be delivered from the feed cylinder to maintain the pressure on the meat in the stuffing machine at a constant level all the time. However, during the suction stroke of the reciprocating pump, the meat is not fed to the stuffing machine, so that a decrease in the pressure on the meat cannot be avoided. Thus, reliable filling of meat from the stuffing machine into casings has not been accomplished.

SUMMARY OF THE INVENTION

An object of the invention is to provide a novel and improved meat feeding method and apparatus, which solves the aforesaid problem.

Another object of the invention is to provide a novel and improved meat feeding method and apparatus, wherein meat can be continuously fed irrespective of the suction and delivery strokes of the reciprocating pump and the pressure on the meat can be maintained constant at all times.

According to the invention, at least two reciprocating pumps are used to suck meat alternately into the feed cylinders of the reciprocating pumps and deliver it alternately from the feed cylinders of the reciprocating pumps. In addition, before the delivery stroke of one reciprocating pump is completed, the delivery stroke of the other reciprocating pump is started. Thus meat can be continuously fed and the pressure thereon can be maintained constant at all times.

Each of at least two reciprocating pumps according to the invention has a feed cylinder suitable for sucking and delivering meat, a piston received in the feed cylinder for reciprocating movement, and driving means for reciprocatingly moving the piston in accordance with a fixed sequence. Shutter is preferably installed at a meat inlet port communicated with the feed cylinder of each reciprocating pump, and reciprocatingly moved in timed relation with the piston between an opening position in which it opens the inlet port and a closing position in which it closes the inlet port so that meat can be sucked into and delivered from the feed cylinder. The driving means for each reciprocating pump preferably comprises a hydraulic cylinder connected to a fluid supply through a solenoid valve and a relief valve. Each hydraulic cylinder is disposed in alignment with the associated feed cylinder and has a piston operatively connected to the piston of the feed cylinder. The solenoid valve selectively directs fluid under pressure from the supply to the hydraulic cylinder to reciprocatingly move the piston of the hdyraulic cylinder and the piston of the feed cylinder, while the relief valve limits the pressure in the hydraulic cylinder to a fixed value so that the pressure on the meat delivered from the feed cylinder is maintained at a constant level.

The following detailed description and the drawings will clarify the principle and merits of the invention.

DESCRIPTION OF THE PREFERRED EMBODIMENTS

Figure 3:
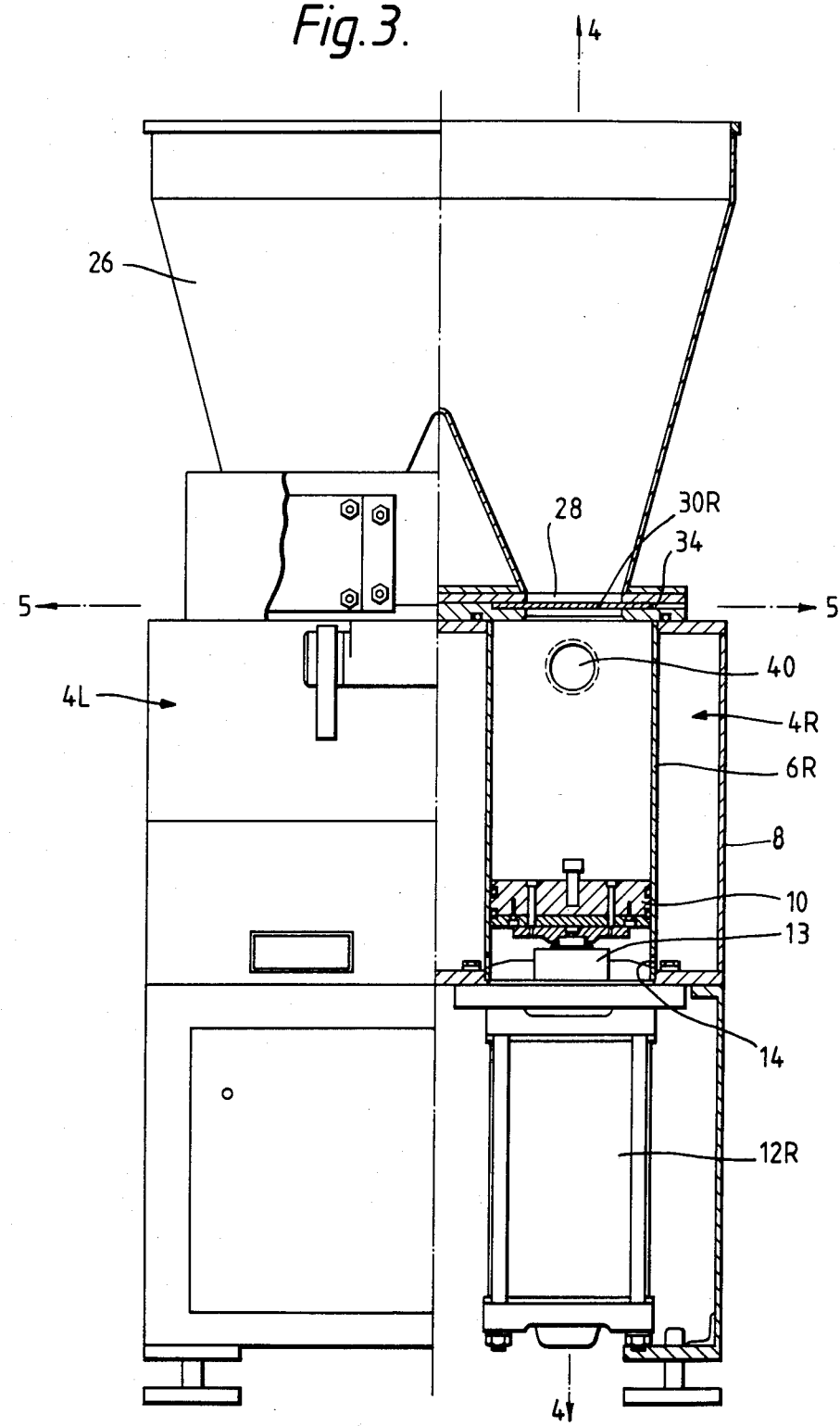
FIG. 3 is an enlarged view, partly broken away, showing the two reciprocating pumps of FIG. 1.
Figure 6:
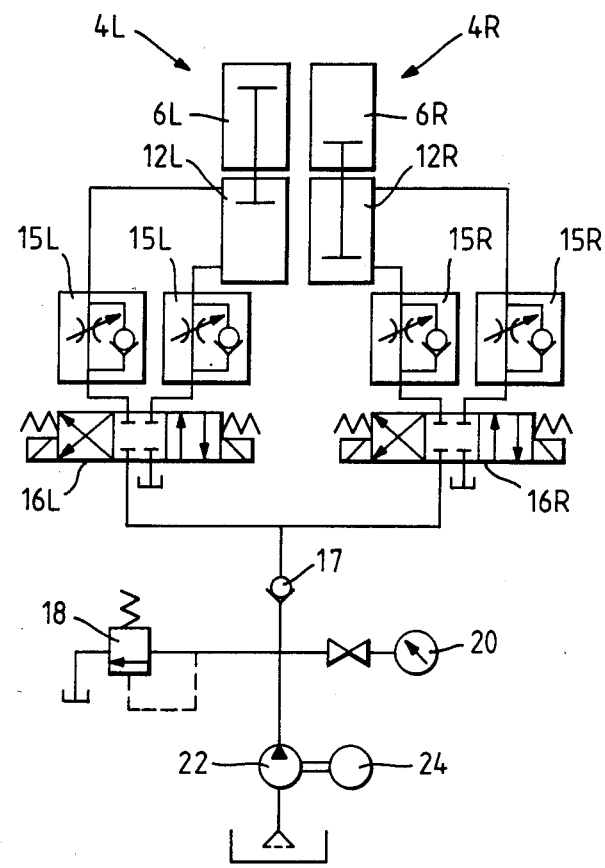
FIG. 6 is a illustrating diagram showing a hydraulic circuit for the reciprocating pumps of FIG. 3.

Referring to the drawings, a meat feeding apparatus according to this invention is shown generally at 2, which comprises two reciprocating pumps 4L and 4R of identical construction. As best shown in FIGS. 3 and 6, the reciprocating pumps 4L and 4R have feed cylinders 6L and 6R, respectively, suitable for sucking and delivering meat, said feed cylinders 6L and 6R being disposed substantially vertically and side by side with each other and fixed to a frame 8. The reciprocating pumps 4L and 4R have pistons 10 received in the feed cylinders 6L and 6R for reciprocating movement, and driving means for reciprocatingly moving the pistons 10 in accordance with a fixed sequence. The driving means may comprise hydraulic cylinders 12L and 12R disposed in alignment with the feed cylinders 6L and 6R, the hydraulic cylinders 12L and 12R being disposed substantially vertically below the feed cylinders 6L and 6R and fixed to the frame 8. The hydraulic cylinders 12L and 12R have pistons operatively connected to the pistons 10 of the feed cylinders 6L and 6R by connecting rods 13. The feed cylinders 6L and 6R each includes a plurality of vent holes 14 formed in the peripheral wall of the feed cylinders 6L and 6R at lower end portion thereof to admit and discharge air into and out of the lower end portion of the feed cylinder 6L and 6R. If oil is leaked from the hydraulic cylinders 12L and 12R into the lower end portions of the feed cylinders 6L and 6R, it can be also spilled out through the vent holes 14.

It may be thought of to dispose the feed cylinders 6L and 6R and the hydraulic cylinders 12L and 12R substantially horizontally, rather than substantially vertically, in alignment with each other. However, it is desirable to dispose the feed cylinders 6L and 6R and hydraulic cylinders 12L and 12R substantially vertically in alignment with each other, respectively, as in this embodiment, in order to make the entire apparatus compact. Further, the hydraulic cylinders 12L and 12R may be replaced by air cylinders or some other driving cylinders, but hydraulic cylinders can be controlled more accurately and reliably than air cylinders.

The hydraulic cylinders 12L and 12R are connected successively to flow regulators 15L and 15R, solenoid valves 16L and 16R, a check valve 17, a relief valve 18, a pressure indicator 20, and a fluid supply or pump 22 driven by a motor 24. Therefore, fluid under pressure is supplied from the pump 22 through the check valve 17 into the solenoid valves 16L and 16R, and directed selectively to the hydraulic cylinders 12L and 12R by the solenoid valves 16L and 16R to reciprocatingly move the pistons of the hydraulic cylinders 12L and 12R. Therefore, the pistons 10 of the feed cylinders 6L and 6R are reciprocatingly moved upward and downward integrally with the pistons of the hydraulic cylinders 12L and 12R and the connecting rods 13. The relief valve 18 limits the pressures in the hydraulic cylinders 12L and 12R to a fixed value. As will be subsequently described in more detail, this can hold the pressure on the meat delivered from the feed cylinders 6L and 6R at a fixed level.

Figure 4:
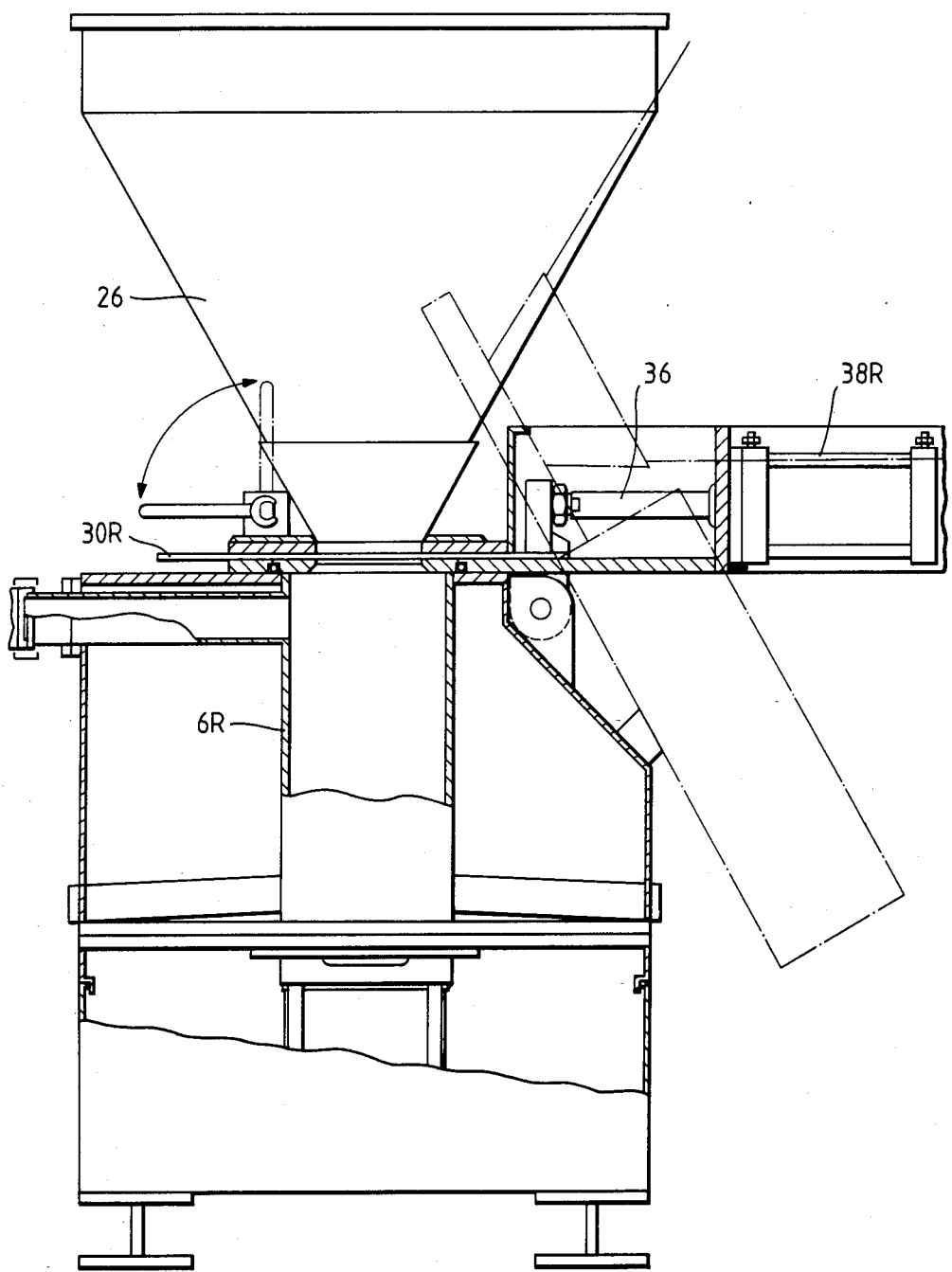
FIG. 4 is a sectional view taken along the line 4—4 in FIG. 3.
Figure 5:
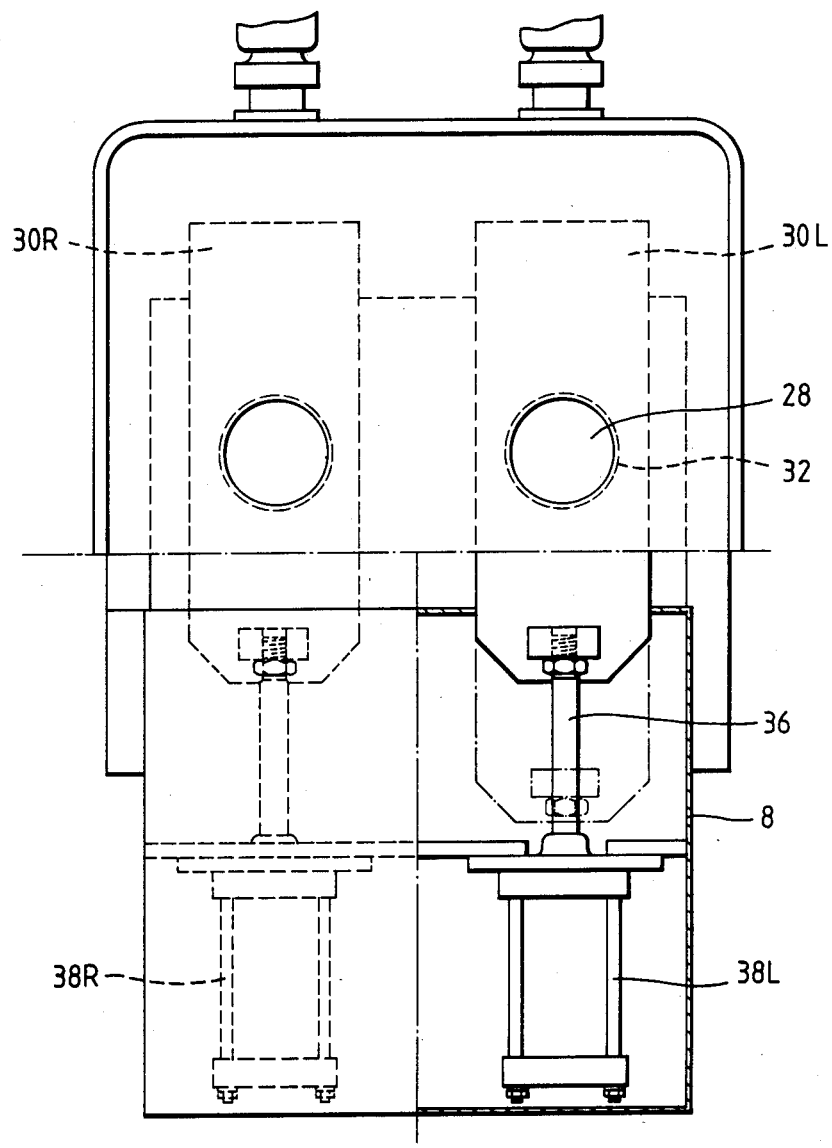
FIG. 5 is a sectional view taken along the line 5—5 in FIG. 3.

Meat is charged into a hopper 26 disposed above the reciprocating pumps 4L and 4R. The reciprocating pumps 4L and 4R have meat inlet ports 28 communicating with the feed cylinders 6L and 6R, and shutters 30L and 30R for said inlet ports 28, respectively. The hopper 26 is connected to the inlet ports 28 of the reciprocating pumps 4L and 4R. As best shown in FIGS. 4 and 5, the shutters 30L and 30R each has the form of a plate which includes a through hole 32 having a corresponding size to that of the inlet port 28, and fitted in a groove 34 in the frame 8 for horizontally sliding movement between a opening position in which it opens the inlet port 28 with the through hole 32 thereof aligned with the port 28 and a closing position in which it closes the inlet port 28. The shutters 30L and 30R are operatively connected to the pistons of hydraulic cylinders 38L and 38R by connecting rods 36, said hydraulic cylinders 38L and 38R being fixed to the frame 8 and connected to the fluid supply through solenoid valves. As will be subsequently described, the hydraulic cylinders 38L and 38R move the shutters 30L and 30R in timed relation with the pistons 10 of the cylinders 6L and 6R, thereby sucking and delivering meat into and from the feed cylinders 6L and 6R.

Figure 1:
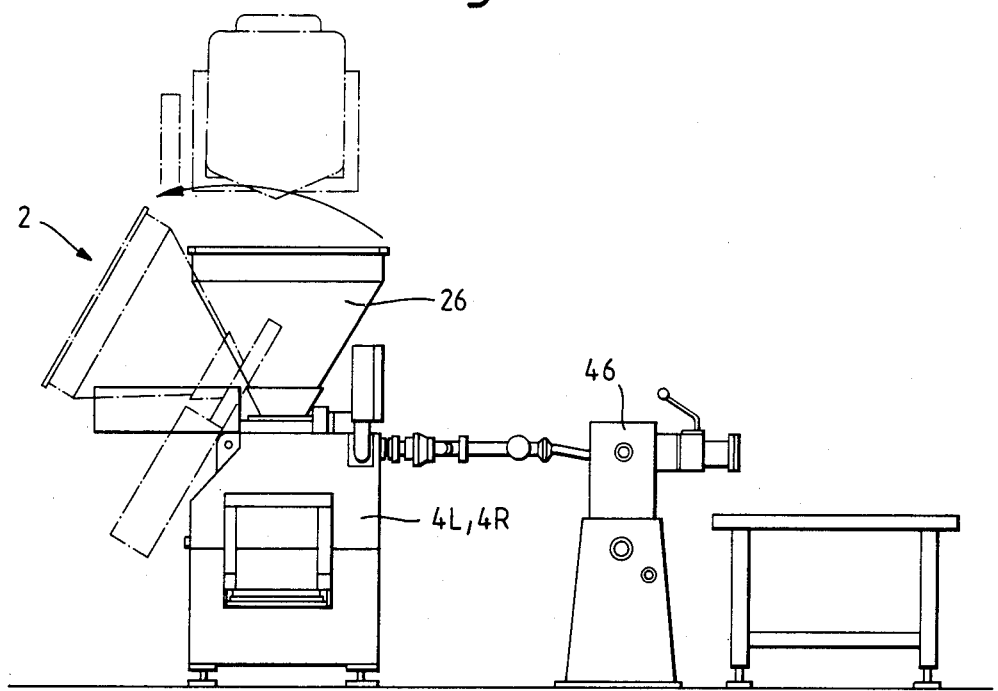
FIG. 1 is a schematic side view of a meat feeding apparatus according to a preferred embodiment of the invention.
Figure 2:
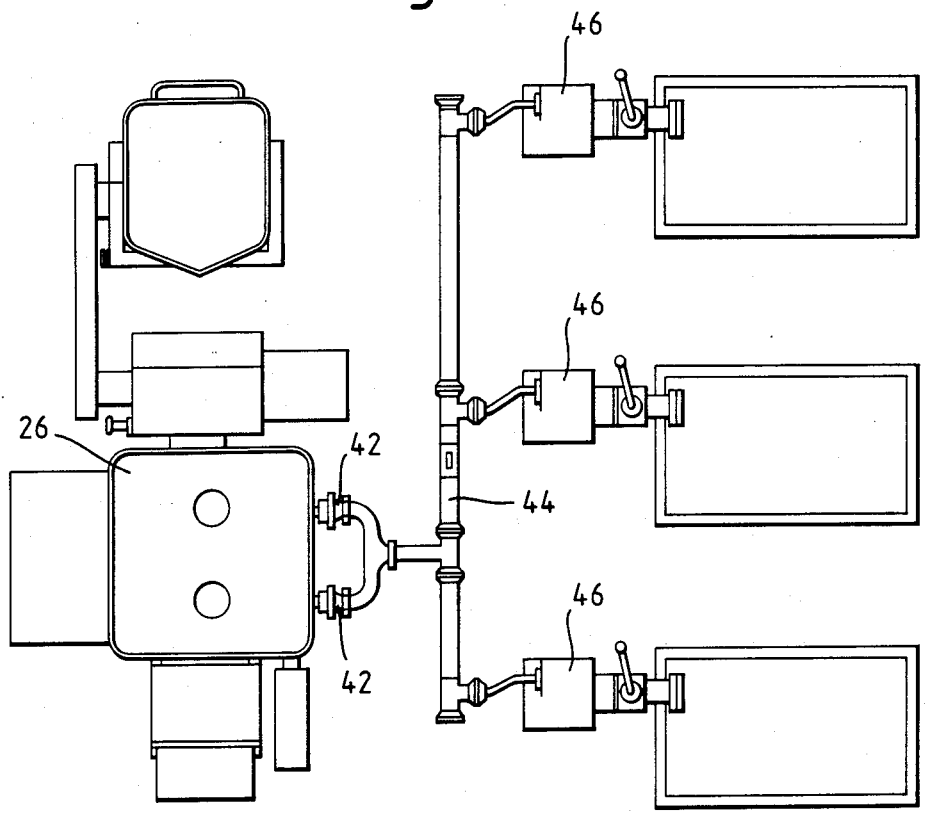
FIG. 2 is a schematic plan view of the meat feeding apparatus of FIG. 1.

The reciprocating pumps 4L and 4R have meat outlet ports 40 communicating with the feed cylinders 6L and 6R, respectively. As best shown in FIG. 2, each outlet port 40 is connected to a check valve 42 and a single common pipe 44, the latter being connected to a plurality of sausage stuffing machines 46.

Meat is sucked into and delivered from the feed cylinders 6L and 6R in the following manner. For example, when sucking meat into the feed cylinder 6R of the reciprocating pump 4R, the solenoid valve for the hydraulic cylinder 38R is energized to direct fluid under pressure to the hydraulic cylinder 38R, so that the shutter 30R is slidingly moved along the groove 34 in the frame 8 to its opening position. Accordingly, the through hole 32 in the shutter 30R is bought into alignment with the inlet port 28 of the reciprocating pump 4R to open the inlet port 28. The solenoid valve 16R of the hydraulic cylinder 12R is then energized so that fluid under pressure from the fluid supply 22 is directed into the hydraulic cylinder 12R to lower the piston 10 of the feed cylinder 6R. Therefore, meat is sucked from the hopper 26 into the feed cylinder 6R through the inlet port 28 of the reciprocating pump 4R and the through hole 32 of the shutter 30R. Thereafter, when delivering meat from the feed cylinder 6R of the reciprocating pump 4R, the solenoid valve 16R of the hydraulic cylinder 12R is energized so that fluid under pressure is directed into the hydraulic cylinder 12R to raise the piston 10 of the feed cylinder 6R. Further, the solenoid valve of the hydraulic cylinder 38R is energized so that fluid under pressure is directed into the hydraulic cylinder 38R to move the shutter 30R to its closed position. Therefore, the inlet port 28 is closed by the shutter 30R and the meat is pushed up by the piston 10 and delivered from the feed cylinder 6R. The meat is forced to flow through the outlet port 40 of the reciprocating pump 4R and the check valve 42 into the pipe 44, through which it is fed into the stuffing machines 46. In the same manner as with the reciprocating pump 4R, meat can be sucked into and delivered from the feed cylinder 6L of the reciprocating pump 4L and fed into the filling machines 46.

The reciprocating pumps 4L and 4R in the embodiment are intended and arranged to reciprocatingly move the pistons 10 of the feed cylinders 6L and 6R in accordance with a fixed sequence, and reciprocatingly move the shutters 30L and 30R in timed relation with the pistons 10 of the feed cylinders 6L and 6R. As a result, meat is sucked alternately into the feed cylinders 6L and 6R of the reciprocating pumps 4L and 4R and delivered alternately from the feed cylinders 6L and 6R of the reciprocating pumps 4L and 4R. In this connection, before the delivery stroke of one reciprocating pump is completed, the delivery stroke of the other reciprocating pump is started. Thus, meat is continuously fed into the stuffing machines 46 so that the pressure on the meat in each stuffing machine 46 does not lower. Further, during the delivery stroke of the reciprocating pump 4L or 4R, the pressure in the hydraulic cylinder 12L or 12R is limited by the relief valve 18 to a fixed value, so that the pressure on the meat delivered from the feed cylinder 6L or 6R is maintained at a fixed level. Therefore, the pressure on the meat in each filling machine 46 can be maintained constant at all times and reliably filled from each filling machine into sausage casings.

Figure 7:
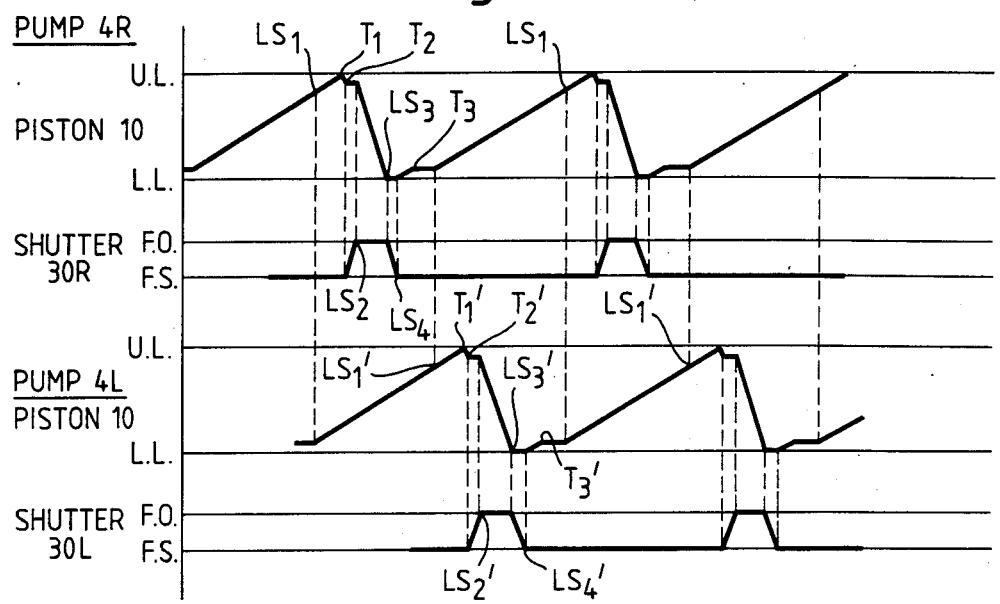
FIG. 7 is a time chart showing a sequence for moving the pistons and shutters of the reciprocating pumps in FIG. 3.

FIG. 7 shows a sequence for moving the pistons 10 and the shutters 30L and 30R in the reciprocating pumps 4L and 4R. In the preferred embodiment, the solenoid valves 16L and 16R for the hydraulic cylinders 12L and 12R and the solenoid valves for the hydraulic cylinders 38L and 38R are automatically controlled by limit switches $LS_1$–$LS_4$ and $LS_1'$–$LS_4'$ and timers $T_1$–$T_3$ and $T_1'$–$T_3'$. When the piston 10 of the feed cylinder 6R rises to a position close to the upper limit position (U.L.) before the delivery stroke of the reciprocating pump 4R is completed, the limit switch $LS_1$ detects the position of the piston 10 and the detection signal is given to the solenoid valve 16L of the reciprocating pump 4L. As a result, the solenoid valve 16L is energized to cause the hydraulic cylinder 12L to raise the piston 10 of the feed cylinder 6L, thus starting the delivery stroke of the reciprocating pump 4L. After the limit switch $LS_1$ is actuated, the piston 10 of the reciprocating pump 4R is raised for a period of time, e.g. 3 seconds, set by the timer $T_1$, to reach the upper limit position U.L., where the delivery stroke of the reciprocating pump 4R is ended. Accordingly, 3 seconds before the delivery stroke of the reciprocating pump 4R is finished, the delivery stroke of the reciprocating pump 4L is started.

When the delivery stroke of the reciprocating pump 4R is finished, a time-up signal from the timer $T_1$ is given to the solenoid valve 16R of the hydraulic cylinder 12R, so that the hydraulic cylinder 12R slightly lowers the piston 10 of the feed cylinder 6R. Therefore, the pressure on the meat in the feed cylinder 6R is reduced. Upon the lapse of a time, e.g. 0.2 second, set by the timer $T_2$, a time-up signal from the timer $T_2$ is given to the solenoid valve 16R of the hydraulic cylinder 12R, so that the hdyraulic cylinder 12R stops the piston 10 of the feed cylinder 6R, holding said piston standing by. At the same time, a time-up signal from the timer $T_2$ is given to the solenoid valve of the hdyraulic cylinder 38R, so that the hydraulic cylinder 38R opens the shutter 30R. Since the piston 10 of the feed cylinder 6R has been slightly lowered to reduce the pressure on the meat in the feed cylinder 6R prior to the opening of the shutter 30R, the meat will not flow out of the feed cylinder 6R back into the hopper 26. When the shutter 30R is fully opened, the limit switch $LS_2$ detects the position of the shutter 30R and its detection signal is sent to the solenoid valve 16R of the hydraulic cylinder 12R, so that the hydraulic cylinder 12R lowers the piston 10 of the feed cylinder 6R toward the lower limit position L.L. Therefore, the suction stroke of the reciprocating pump 4R is started, sucking meat from the hopper 26 into the feed cylinder 6R. When the piston 10 of the feed cylinder 6R is lowered to the lower limit position L.L., the limit switch $LS_3$ detects the position of the piston 10 and the detection signal is given to the solenoid valve 16R of the hydraulic cylinder 12R, so that the hydraulic cylinder 12R stops the piston 10 of the feed cylinder 6R. Thus, the suction stroke of the feed pump 4R is completed. Concurrently therewith, a detection signal from the limit switch $LS_3$ is transferred to the solenoid valve of the hydraulic cylinder 38R and the shutter 30R is closed by the hydraulic cylinder 38R.

Thereafter, when the shutter 30R is completely closed, the limit switch $LS_4$ detects the position of the shutter 30R and its detection signal is given to the solenoid valve 16R of the hydraulic cylinder 12R, so that the hydraulic cylinder 12R slightly raises the piston 10 of the feed cylinder 6R. Accordingly, the pressure on the meat in the feed cylinder 6R is increased. Thereafter, when a period of time, e.g. 0.5 second, set by the timer $T_3$ elapses, a time-up signal from the timer $T_3$ is given to the solenoid valve 16R of the hydraulic cylinder 12R, so that the hydraulic cylinder 12R stops piston 10 of the feed cylinder 6R, holding said piston standing by. When the piston 10 of the feed cylinder 4L is raised to a position close to the upper limit position U.L. before the delivery stroke of the reciprocating pump 4L is completed, the limit switch $LS_1'$ detects the position of the piston 10 of the reciprocating pump 4L and its detection signal is transferred to the solenoid valve 16R of the reciprocating pump 4R, so that the piston 10 of the reciprocating pump 4R rises toward the upper limit position U.L. Thus, the delivery stroke of the reciprocating pump 4R is started and the meat is delivered from the feed cylinder 12R and fed to the stuffing machines 46.

As in the case of the reciprocating pump 4R, after the limit switch $LS_1'$ has been actuated, the piston 10 of the reciprocating pump 4L further rises for the period of time set by the timer $T_1'$, i.e., 3 seconds, to reach the upper limit position U.L., where the delivery stroke of the reciprocating pump 4L is ended. The piston 10 of the reciprocating pump 4L is then slightly lowered in response to a time-up signal from the timer $T_1'$. Thereafter, upon the lapse of the time set by the timer $T_2'$, i.e., 0.2 second, the piston 10 of the reciprocating pump 4L stops to stand by, and the shutter 30L of the reciprocating pump 4L is opened. When the shutter 30L is completely opened, the limit switch $LS_2'$ detects the position of the shutter 30L, whereby the piston 10 of the reciprocating pump 4L is lowered toward the lower limit L.L. to start the suction stroke of the reciprocating pump 4L. Upon completion of the suction stroke of the reciprocating pump 4L, the limit switch $LS_3'$ detects the position of the piston 10 of the reciprocating pump 4L to stop the piston and close the shutter 30L of the reciprocating pump 4L. When the shutter 30L is completely closed, the limit switch $LS_4'$ detects the position of the shutter 30L, whereby the piston 10 of the reciprocating pump 4L is slightly raised. Upon the lapse of the time by set by the timer $T_3'$, i.e., 0.5 second, the piston 10 of the reciprocating pump 4L stops to stand by. Before the delivery stroke of the reciprocating pump 4R is completed, the limit switch $LS_1$ detects the position of the piston 10 of the reciprocating pump 4R, thereby raising the piston 10 of the reciprocating pump 4R to start the delivery stroke of the reciprocating pump 4R.

Such operations are alternately repeated, whereby meat is sucked alternately into the feed cylinders 6L and 6R of the reciprocating pumps 4L and 4R and delivered alternately from the feed cylinders 6L and 6R of the reciprocating pumps 4L and 4R. Before the delivery stroke of one reciprocating pump is completed, the delivery stroke of the other reciprocating pump is started, whereby the meat is continuously fed into the stuffing machines so that the pressure on the meat in each stuffing machine is maintained constant at all times.

While a meat feeding method and apparatus using two reciprocating pumps 4L and 4R have been described so far, it is possible to use three or more reciprocating pumps. In the case of two reciprocating pumps 4L and 4R, if it is required to increase the feed rate of meat, it is necessary to increase the rising and lowering speeds of the reciprocating pumps 4L and 4R so as to increase the amounts of their delivery and suction. However, particularly where the viscosity of meat is high, though there is no trouble in increasing the rising speed of the piston so as to increase the amount of delivery, increasing the lowering speed of the piston sometimes results in the failure of meat to follow the piston movement so that it cannot be completely sucked. Therfore, there is a problem that the increase in the lowering speed of the piston is limited and hence meat cannot be fed continuously. On the other hand, if three or more reciprocating pumps are used, it is possible to increase the feed rate of meat even if the rising and lowering speeds of the piston of each reciprocating pump are not increased.

Figure 8:
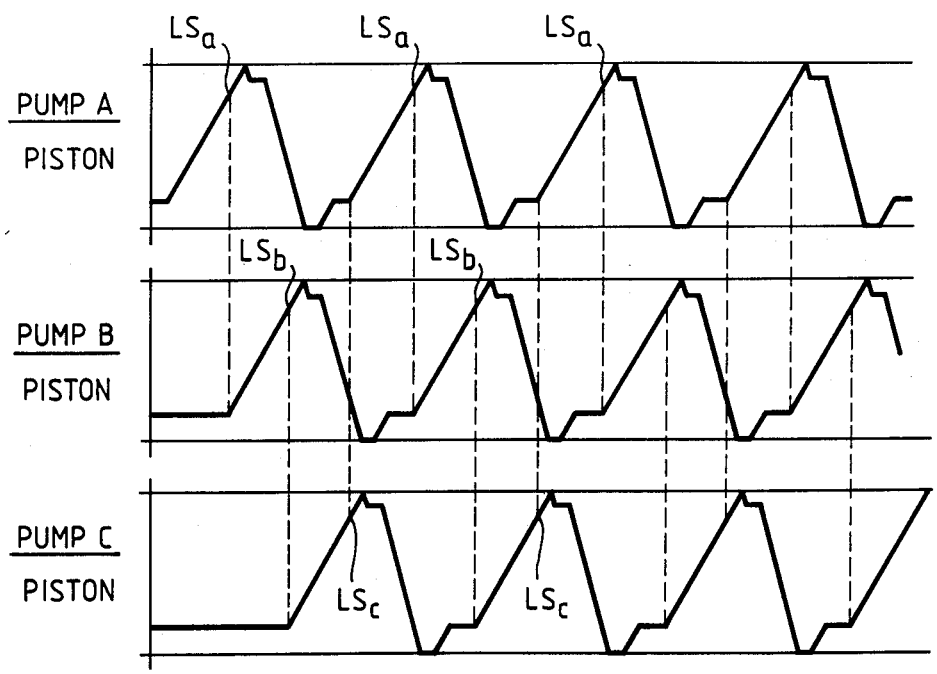
FIG. 8 is a time chart showing a piston movement sequence when three reciprocating pumps are used.

FIG. 8 shows a sequence for moving the pistons of three reciprocating pumps A, B and C. The reciprocating pumps A, B and C are substantially the same in construction as the reciprocating pumps 4L and 4R in the preceding embodiment and are controlled in substantially the same manner as in the preceding embodiment. As is clear from a comparison between FIGS. 7 and 8, the pistons of the reciprocating pumps A, B and C are raised and lowered with a phase similar to that for the reciprocating pumps 4L and 4R. Though not shown for convenience sake, as in the case of the shutters 30L and 30R for the reciprocating pumps 4L and 4R, shutters for the reciprocating pumps A, B and C are moved in timed relation to the pistons of the reciprocating pumps A, B and C to open or close their inlet ports. Therefore, meat is sucked into the feed cylinders of the reciprocating pumps A, B and C. Further, before the delivery stroke of the reciprocating pump A is completed, a limit switch LSa detects the position of the piston of the reciprocating pump A, whereby the delivery stroke of the reciprocating pump B is started. Then, before the delivery stroke of the reciprocating pump B is completed, a limit switch LSb detects the position of the piston of the reciprocating pump B, whereby the delivery stroke of the reciprocating pump C is started. Further, before the delivery stroke of the reciprocating pump C is completed, a limit switch LSc detects the position of the piston of the reciprocating pump C, whereby the delivery stroke of the reciprocating pump A is started. Therefore, meat can be continuously fed and maintained under a fixed pressure.

What is claimed is:

1. A method of continuously feeding meat at constant pressure using a plurality of reciprocating pumps, comprising the steps of:
   (a) providing at least two reciprocating pumps, each pump having a piston movable in a feed cylinder, each feed cylinder having meat inlet ports and outlet ports, said outlet ports being connected to a common discharge line,
   (b) operating the pumps for sucking meat during respective suction strokes alternately through the inlet ports and into the feed cylinders, and for delivering meat during respective delivery strokes alternately through the outlet ports from the feed cylinders,
   (c) pre-compressing the meat within the feed cylinder of one pump by slightly moving the piston of said one pump after the completion of the suction stroke of said one pump, and
   (d) starting the delivery stroke of said one pump prior to the completion of the delivery stroke of another pump, and actually pumping the meat from the feed cylinder of said one pump so as to feed meat under pressure continuously into the discharge line and to maintain the pressure on the meat at a constant level within the discharge line.

2. A method as set forth in claim 1, wherein said meat is a material for coarsely ground sausages, which is fed to sausage stuffing machines by said reciprocating pumps.

3. An apparatus for continuously feeding meat at constant pressure using a plurality of reciprocating pumps, comprising:
   (a) at least two reciprocating pumps, each pump having
      (i) a feed cylinder suitable for sucking and delivering meat,
      (ii) a piston received in said feed cylinder for reciprocating movement,
      (iii) a meat inlet port communicated with said feed cylinder,
      (iv) a meat outlet port communicated with said feed cylinder, and
      (v) the outlet ports of said reciprocating pumps being connected to a common discharge line; and
   (b) driving means for reciprocatingly moving said pistons in accordance with a fixed sequence, to suck meat alternately during respective suction strokes into the feed cylinders of said reciprocating pumps and delivery meat alternately during respective delivery strokes from the feed cylinders of said reciprocating pumps, in such a manner that after the completion of the suction stroke of one reciprocating pump, the piston of said one pump is slightly moved to pre-compress the meat within the feed cylinder of said one reciprocating pump, and that before the delivery stroke of another reciprocating pump is completed, the delivery stroke of said one reciprocating pump is started to actually pump meat from the feed cylinder of said one pump, whereby meat under pressure can be fed continuously into said discharge line and pressure on the meat can be maintained at a constant level within said discharge line.

4. An apparatus as set forth in claim 3, wherein each reciprocating pump has a meat outlet port communicating with said feed cylinder, and a shutter for said inlet port, said shutter being adapted to move in timed relation to said piston between a first position in which it opens said inlet port and a second position in which it closes said inlet port, whereby meat is sucked into and delivered from said feed cylinder.

5. An apparatus as set froth in claim 4, wherein said discharge line is connected to a plurality of sausage stuffing machines, to feed meat for coarsely ground sausages into said sausage stuffing machines.

6. An apparatus as set forth in claim 4, including a hopper to be charged with meat, said hopper being disposed above said reciprocating pumps and connected to inlet ports thereof to suck meat from said hopper into said feed cylinders.

7. An apparatus as set forth in claim 3, wherein the driving means for each reciprocating pump comprises a driving cylinder disposed in alignment with said feed cylinder, and a rod for operatively connected the piston of said feed cylinder to the piston of said driving cylinder.

8. An apparatus as set forth in claim 7, wherein the feed cylinder of each reciprocating pump is substantially vertically disposed and the driving cylinder of each reciprocating pump is disposed substantially vertically below said feed cylinder.

9. An apparatus as set forth in claim 8, wherein the feed cylinder of each reciprocating pump includes a plurality of vent holes formed in the peripheral wall of the feed cylinder at a lower end portion thereof to admit and discharge air into and out of the lower end portion of the feed cylinder.

10. An apparatus as set forth in claim 9, wherein the driving cylinder of each reciprocating pump comprises a hydraulic cylinder oil from which is spilled out through the vent holes.

11. An apparatus as set forth in claim 7, wherein the driving cylinder of each reciprocating pump is a hydraulic cylinder connected to a fluid supply through a solenoid valve and a relief valve, said solenoid valve being adapted to selectively direct fluid under pressure from said fluid supply into said hydraulic cylinder to reciprocatingly move the piston of said hydraulic cylinder and the piston of said feed cylinder, said relief valve serving to limiting the pressure in said hydraulic cylinder to a fixed value, whereby the pressure on the meat can be maintained at a constant level within said discharge line.

12. An apparatus for feeding meat by reciprocating pumps, comprising:
 (a) three or more reciprocating pumps, each pump having
  (i) a feed cylinder suitable for sucking and delivering meat,
  (ii) a piston received in said feed cylinder for reciprocating movement,
  (iii) a meat inlet port communicated with said feed cylinder,
  (iv) a meat outlet port communicated with said feed cylinder, and
  (v) the outlet ports of said reciprocating pumps being connected to a common discharge line; and
 (b) driving means for reciprocatingly moving said pistons in accordance with a fixed sequence, to suck meat alternately during respective suction strokes into the feed cylinders of said reciprocating pumps and deliver meat alternately during respective delivery strokes from the feed cylinders of said reciprocating pumps, in such a manner that after the completion of the suction stroke of one reciprocating pump, the piston of said one pump is slightly moved to pre-compress the meat within the feed cylinder of said one reciprocating pump, and that before the delivery stroke of another reciprocating pump is completed, the delivery stroke of said one reciprocating pump is started to actually pump meat from the feed cylinder of said one pump, whereby meat under pressure can be fed continuously into said discharge line and the pressure on the meat can be maintained at a constant level within said discharge line.

* * * * *